Dec. 3, 1940.   R. R. WELCH   2,223,879
ANGLE TRUING DEVICE
Filed Oct. 28, 1938

RODNEY R. WELCH.
INVENTOR.

BY *Stanley Lightfoot*
ATTORNEY.

Patented Dec. 3, 1940

2,223,879

UNITED STATES PATENT OFFICE 2,223,879

ANGLE TRUING DEVICE

Rodney R. Welch, Detroit, Mich.

Application October 28, 1938, Serial No. 237,390

1 Claim. (Cl. 125—11)

This invention relates to a device for the guiding of a truing tool, such as a diamond nib, at precisely determined angles to work being trued, such as in the truing of grinding wheels, and has for its object to provide a very simple and sturdy device of this nature which by its construction admits of very accurate manufacture without difficulty and is capable of very accurate angular setting in use.

An object of the invention is also to provide such a device having a slideway for the truing tool so arranged that it admits of ready manual operation of the said truing tool with a minimum of danger of injury to the operator's hands; and which admits of reconditioning of the guiding surfaces from time to time without interference with any of the elements of assembly or disturbance of such elements such as might result in destroying the accuracy of the device.

Still further objects and advantages subsidiary to or resulting from the aforesaid objects, or from the construction or operation of the invention as it may be carried into effect, will become apparent as the said invention is hereinafter further disclosed.

In carrying the said invention into effect, I may provide the novel construction and arrangement of parts and surfaces hereinafter described, by way of example, having reference to the accompanying drawing, wherein.

Similar characters of reference indicate similar parts of both figures of the drawing.

Figure 1:
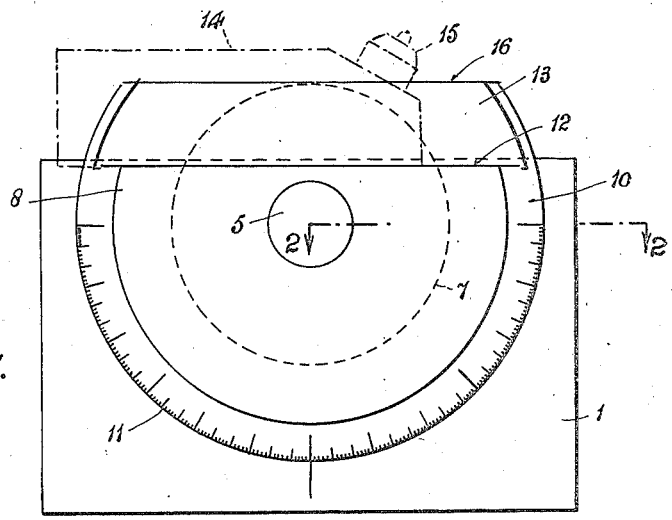
Figure 1 is an elevation of my improved angle truing device.
Figure 2:
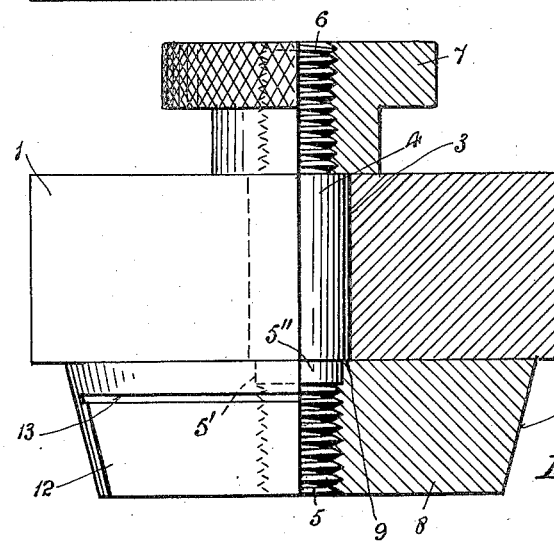
Figure 2 is a plan of the same, partly in section taken on a plane indicated by the line 2—2 Figure 1.

I is a block or body of the device which may be of any suitable form to meet the circumstances under which the device is to be used, the illustration showing plane rectangular block more particularly adapted to be used on a magnetic chuck so that in this example no provision is made for the use of clamping or hold-on devices as will be readily understood.

The block is transversely bored at 3 to receive the plain intermediate portion 4 of a spindle, the projecting ends 5 and 6 of which spindle are threaded; and 7 is a clamping nut mounted on the threaded portion 6 of the said spindle and adapted when suitably rotated to engage the back of the block 1.

8 is a disk-like plate securely threaded on the portion 5 of the spindle for permanent attachment thereto, the rear face of the plate 8 firmly and truly abutting the shoulder 9 on the front end of the intermediate portion 4 of the spindle whereby the rear ground surface of the said plate may be truly square to the axis of the said spindle; and the peripheral surface 10 of the said plate is conical to readily expose graduations 11 to view whereby angular rotation of the said plate may be readily determined.

It is intended that the surface 10 be ground after hardening, and to overcome any distortion which may have resulted from hardening, I prefer to countersink the back of the plate at 5' and grind this countersink squarely with the rear surface and concentric with the periphery of the plate to receive a plain extension or pilot 5" of the said spindle as shown, whereby the desired accuracy may be attained.

The upper part of the plate above the threaded portion 5 of the spindle is cut away to provide plane surfaces 12 and 13 forming a guide and slideway for any suitable tool holder, such as 14 in which a diamond nib 15 or other suitable truing tool may be mounted. The surface 13 of the slideway is on a plane truly transverse of the axis of the said spindle, and the surface 12 is on a plane preferably right angles to the surface 13 and forms a chord of the circle of the said disk-plate plate 8, being sufficiently removed from the center thereof that it does not intersect the extension 5 of the spindle and therefore in no way interferes with the assembly of the said spindle to the plate or the securing and maintaining of the square relationship between the back of the plate and the axis on the spindle.

The top of the plate is preferably cut away as at 16 to avoid interference and freely expose the diamond nib to the work.

It will be readily seen that the disk may be easily adjusted to secure a desired angularity of the slideway relative to the work, and secured in such position of adjustment by the tightening of the nut 7 against the back of the body 1, whereby the diamond nib or other tool may be manually moved over the slideway along the path of the required angle to secure the truing of the work, such as a grinding wheel, to such angle.

The construction described admits of great accuracy both in its manufacture and in its use, and, if necessary due to damage or otherwise, the slideway may be reground without affecting the accuracy of the mounting or the spindle or to suit a tool holder the cross section of which may be other than square; or by drilling or otherwise machining the said slideway may be adapted to receive sine-bars or other apparatus for checking or other use with the device as may be desired.

This invention may be developed within the scope of the following claim without departing from the essential features of the said invention, and it is desired that the specification and drawing be read as being merely illustrative and not in a limiting sense, except as necessitated by the prior art.

What I claim is:

In a device of the class described, a body, a horizontal spindle rotatable in said body, said spindle having threaded portions extending forwardly and rearwardly of said body, a disk-like plate threaded on said spindle and rotatable over a face of said body, said plate having a concentric countersink in the back thereof and said spindle having a pilot fitting in said countersink, said plate having also a slideway formed therein as a chord thereof, and means for clamping said plate in positions of rotary adjustment.

RODNEY R. WELCH.